United States Patent
Adachi et al.

(10) Patent No.: US 11,245,859 B2
(45) Date of Patent: Feb. 8, 2022

(54) SHOOTING SYSTEM, SHOOTING METHOD, AND PROGRAM

(71) Applicant: SONY CORPORATION, Tokyo (JP)

(72) Inventors: Hiroaki Adachi, Tokyo (JP); Hidehiro Amaki, Tokyo (JP); Takuya Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/202,409

(22) Filed: Mar. 16, 2021

(65) Prior Publication Data
US 2021/0203858 A1 Jul. 1, 2021

Related U.S. Application Data

(63) Continuation of application No. 16/062,370, filed as application No. PCT/JP2016/005203 on Dec. 21, 2016, now Pat. No. 11,019,282.

(30) Foreign Application Priority Data

Jan. 6, 2016 (JP) .............................. JP2016-000985

(51) Int. Cl.
*H04N 5/268* (2006.01)
*H04N 5/222* (2006.01)
(Continued)

(52) U.S. Cl.
CPC .............. *H04N 5/268* (2013.01); *G03B 37/04* (2013.01); *H04N 5/222* (2013.01);
(Continued)

(58) Field of Classification Search
CPC .. H04N 5/222; H04N 5/2228; H04N 5/23203; H04N 5/23206; H04N 5/23216; H04N 5/232933; H04N 5/232939; H04N 5/23296; H04N 5/23299; H04N 5/262; H04N 5/268; H04N 7/181
See application file for complete search history.

(56) References Cited

U.S. PATENT DOCUMENTS

| | | | |
|---|---|---|---|
| 6,597,393 B2 | 7/2003 | Kato et al. | |
| 6,909,457 B1 | 6/2005 | Fukasawa | |

(Continued)

FOREIGN PATENT DOCUMENTS

| | | |
|---|---|---|
| JP | 10-341429 A | 12/1998 |
| JP | 2001-021786 A | 1/2001 |

(Continued)

OTHER PUBLICATIONS

Non-Final Office Action for U.S. Appl. No. 16/062,370, dated Aug. 12, 2019, 9 pages.

(Continued)

*Primary Examiner* — Daniel M Pasiewicz
(74) *Attorney, Agent, or Firm* — Chip Law Group

(57) ABSTRACT

This shooting system includes a plurality of cameras capable of capturing a subject that moves on a course from different directions, and a controller that receives a setting made by the user regarding a switch order of the plurality of cameras that temporally share continuous shooting of the subject that moves on the course, and switches output videos of the plurality of cameras in accordance with the set switch order.

12 Claims, 13 Drawing Sheets

| Preset ID | Camera ID | Title | Pan angle | Tilt angle | Zoom magnification | File name of thumbnail image |
|---|---|---|---|---|---|---|
| 001 | CAM1 | 100m start | 40.5° | −20° | ×10 | cam1-0001.jpg |
| 002 | CAM1 | Home straight | — | — | — | — |
| 003 | CAM2 | 1st corner | — | — | — | — |
| 004 | CAM3 | Back straight | — | — | — | — |
| 005 | CAM3 | 2nd corner | — | — | — | — |

(51) Int. Cl.
    *H04N 5/232*     (2006.01)
    *H04N 5/262*     (2006.01)
    *H04N 7/18*     (2006.01)
    *G03B 37/04*     (2021.01)

(52) U.S. Cl.
CPC ....... *H04N 5/2228* (2013.01); *H04N 5/23203* (2013.01); *H04N 5/23206* (2013.01); *H04N 5/23216* (2013.01); *H04N 5/23296* (2013.01); *H04N 5/23299* (2018.08); *H04N 5/232933* (2018.08); *H04N 5/232939* (2018.08); *H04N 5/2622* (2013.01); *H04N 5/2624* (2013.01); *H04N 7/181* (2013.01); *G03B 2206/00* (2013.01)

(56) References Cited

U.S. PATENT DOCUMENTS

| | | | |
|---|---|---|---|
| 7,576,742 | B2 | 8/2009 | Kanematsu et al. |
| 8,560,951 | B1 | 10/2013 | Snyder et al. |
| 11,019,282 | B2 * | 5/2021 | Adachi .............. H04N 5/23299 |
| 2001/0033332 | A1 | 10/2001 | Kato et al. |
| 2006/0104625 | A1 | 5/2006 | Oya |
| 2008/0124044 | A1 | 5/2008 | Park |
| 2008/0215983 | A1 | 9/2008 | Wierowski et al. |
| 2012/0079406 | A1 | 3/2012 | Medhurst et al. |
| 2015/0296131 | A1 | 10/2015 | Onsen |
| 2016/0127635 | A1 | 5/2016 | Taoki |

FOREIGN PATENT DOCUMENTS

| | | |
|---|---|---|
| JP | 2001-285850 A | 10/2001 |
| JP | 2002-044654 A | 2/2002 |
| JP | 2007-214839 A | 2/2006 |
| JP | 2006-148260 A | 6/2006 |
| JP | 2006-229322 A | 8/2006 |
| JP | 2007-074034 A | 3/2007 |
| JP | 2007-214839 A | 8/2007 |
| JP | 2014-168148 A | 9/2014 |

OTHER PUBLICATIONS

Final Office Action for U.S. Appl. No. 16/062,370, dated Jan. 21, 2020, 12 pages.

Advisory Action for U.S. Appl. No. 16/062,370, dated Nov. 18, 2020, 3 pages.

International Search Report and Written Opinion of PCT Application No. PCT/JP2016/005203, dated Jan. 31, 2017, 13 pages of English Translation and 09 pages of ISRWO.

International Preliminary Report on Patentability of PCT Application No. PCT/JP2016/005203, dated Jul. 10, 2018, 13 pages of English Translation and 07 pages of IPRP.

Notice of Allowance for U.S. Appl. No. 16/062,370, dated Dec. 30, 2020, 8 pages.

Advisory Action for U.S. Appl. No. 16/062,370, dated Mar. 23, 2020, 3 pages.

Non-Final Office Action for U.S. Appl. No. 16/062,370, dated May 5, 2020, 13 pages.

Final Office Action for U.S. Appl. No. 16/062,370, dated Sep. 8, 2020, 13 pages.

Office Action for JP Patent Application No. 2017-559950, dated Oct. 19, 2021, 05 pages of Office Action and 05 pages of translation.

* cited by examiner

| Preset ID | Camera ID | Title | Pan angle | Tilt angle | Zoom magnification | File name of thumbnail image |
|---|---|---|---|---|---|---|
| 001 | CAM1 | 100m start | 40.5° | −20° | ×10 | cam1-0001.jpg |
| 002 | CAM1 | Home straight | : | : | : | : |
| 003 | CAM2 | 1st corner | : | : | : | : |
| 004 | CAM3 | Back straight | : | : | : | : |
| 005 | CAM3 | 2nd corner | : | : | : | : |
| ... | ... | ... | ... | ... | ... | ... |

| Scene No. | Camera ID | Preset ID | Trigger | |
|---|---|---|---|---|
| 1 | CAM1 ▶ | Pre001 ▶ | pistol ▶ | |
| 2 | CAM2 ▶ | Pre011 ▶ | timer ▶ | 5s ◆ |
| 3 | CAM2 ▶ | Pre021 ▶ | timer ▶ | 5s ◆ |
| 4 | CAM3 ▶ | Pre031 ▶ | take ▶ | |
| 5 | CAM4 ▶ | Pre044 ▶ | timer ▶ | 5s ◆ |
| 6 | CAM1 ▶ | Pre061 ▶ | take ▶ | |

53a — Scene No.
53b — Camera ID
53c — Preset ID
53d — Trigger
53 — (table)
54 — Scenario name
55 — Save
51 — Add
52 — Delete

| | P0 (Starting point) | P1 (Passing point) | P2 (Goal point) |
|---|---|---|---|
| CAM1 | -120 | -150 | -160 |
| CAM2 | -30 | -90 | -130 |
| CAM3 | -20 | -45 | -90 |
| CAM4 | -5 | -8 | -20 |
| CAM5 | +5 | +8 | +20 |

SHOOTING SYSTEM, SHOOTING METHOD, AND PROGRAM

CROSS REFERENCE TO RELATED APPLICATIONS

The present application is a continuation application of U.S. patent application Ser. No. 16/062,370, which is U.S. National Phase of International Patent Application No. PCT/JP2016/005203 filed on Dec. 21, 2016, which claims priority benefit of Japanese Patent Application No. JP 2016-000985 filed in the Japan Patent Office on Jan. 5, 2016. Each of the above-referenced applications is hereby incorporated herein by reference in its entirety.

TECHNICAL FIELD

The present technology relates to a shooting system, a shooting method, and a program for capturing a subject that moves on a course in a stadium or the like by a plurality of cameras arranged at different positions, and switching output images of the cameras to generate one temporally-continuous video.

BACKGROUND ART

There is known a photographing system that photographs a subject by a plurality of cameras and causes output videos of the respective cameras to be displayed on a monitor screen while switching the output videos (see, for example, Patent Literature 1).

CITATION LIST

Patent Literature

Patent Literature 1: Japanese Patent Application Laid-open No. 2007-158860

DISCLOSURE OF INVENTION

Technical Problem

However, in the photographing system described above, for example, a large number of photographing staffs are required, and various other points are required to be improved.

In view of the circumstances as described above, an object of the present technology is to attain a functional improvement and an improvement in operability regarding a system that captures a subject that moves along a course by a plurality of cameras, and switches output videos of the respective cameras to generate one temporally-continuous video.

Solution to Problem

To attain the object described above, a shooting system according to an embodiment of the present technology includes:
a plurality of cameras capable of capturing a subject that moves on a course from different directions; and
a controller that receives a setting made by the user regarding a switch order of the plurality of cameras that temporally share continuous shooting of the subject that moves on the course, and switches output videos of the plurality of cameras in accordance with the set switch order.

The controller may include a display unit capable of displaying the output videos of the plurality of cameras, and the controller may be configured to control the display unit to display a first GUI for receiving, from the user, a command for setting at least any one of a pan angle, tilt angle, and zoom magnification of the individual cameras while viewing the output videos displayed on the display unit.

The controller may be configured to store, while associating an information set, that is constituted of information that has been set using the first GUI, identification information of the camera to be set, and access information for accessing an output video of the camera to be set, and preset identification information that identifies this information set with each other to obtain a scenario generation preset information, a plurality of pieces of scenario generation preset information in a database.

The controller may be configured to control the display unit to display a second GUI that supports the user to generate a scenario for obtaining a video of a single time axis by temporally switching the output videos of the plurality of cameras, by selectively using the plurality of pieces of scenario generation preset information stored in the database.

The scenario may include one or more scenes in time series, and at least the preset identification information may be allocated to each of the scenes.

Further, the scenario may include information related to a trigger for making a switch between the individual scenes.

The controller may be configured to control the display unit to display a third GUI for receiving an input from the user regarding timing information and at least any one of the pan angle, the tilt angle, and the zoom magnification as setting information requisite for shooting while changing a shooting range of the camera.

The controller may be configured to judge an optimum one of the cameras on a basis of position information of a plurality of points on the course and position information of each of the cameras.

A shooting method according to an embodiment of the present technology includes:
preparing a plurality of cameras capable of capturing a subject that moves on a course from different directions; and
receiving, by a controller, a setting made by the user regarding a switch order of the plurality of cameras that temporally share continuous shooting of the subject that moves on the course, and switching output videos of the plurality of cameras in accordance with the set switch order.

A program according to an embodiment of the present technology is a program that causes a computer to function as a controller that controls the switcher to receive, while a plurality of cameras capable of capturing a subject that moves on a course from different directions are arranged, a setting made by the user regarding a switch order of the plurality of cameras that temporally share continuous shooting of the subject that moves on the course, and switch output videos of the plurality of cameras in accordance with the set switch order.

Advantageous Effects of Invention

As described above, according to the present technology, it is possible to attain a functional improvement and an improvement in operability regarding a system that captures a subject that moves along a course by a plurality of cameras, and switches output videos of the respective cameras to generate one temporally-continuous video.

BRIEF DESCRIPTION OF DRAWINGS

FIG. 5 A diagram showing an example of a camera control GUI in a shooting control system according to the first embodiment.

FIG. 7 A diagram showing a scenario editing screen.

MODES FOR CARRYING OUT THE INVENTION

Hereinafter, embodiments of the present technology will be described.

First Embodiment

This embodiment is an image pickup system in which a plurality of cameras capable of capturing a subject such as an athlete who moves on a course from different positions are provided in an athletic field where courses on which the subject moves and the like are set, such as an athletics stadium, for example, and the respective cameras are switched temporally to obtain a video of a single time axis, such as a video capturing a state where an athlete as the subject moves on the course, for example. In this specification, descriptions will be given while focusing particularly on a function of generating, in this shooting system, a scenario for a camera work as in what timing in which order the plurality of cameras are to be switched.

[Hardware Configuration of Shooting System]

Figure 1:
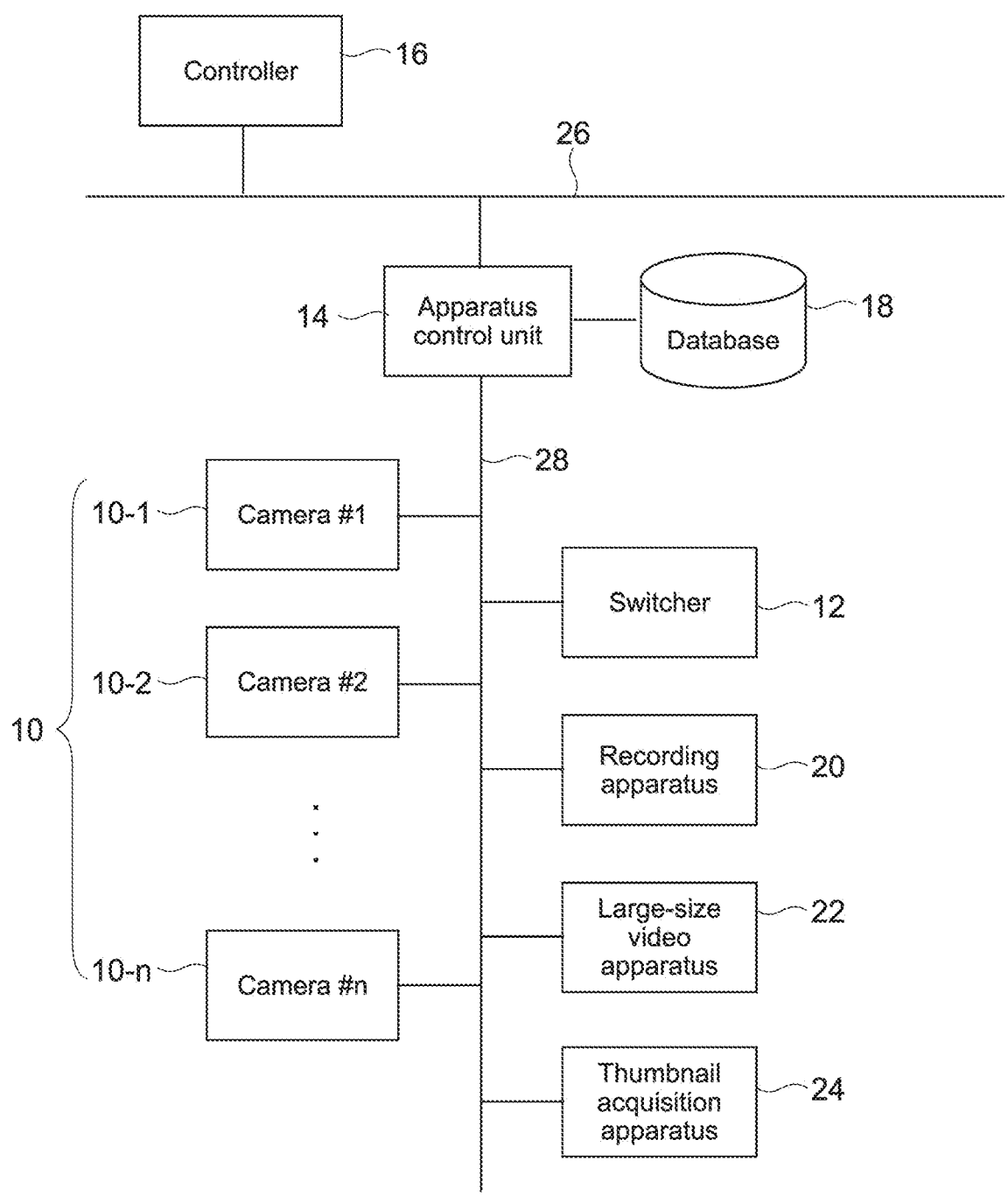
FIG. 1 A block diagram showing an overall hardware configuration of a shooting system according to a first embodiment of the present technology.

FIG. 1 is a block diagram showing an overall hardware configuration of the shooting system.

As shown in the figure, this shooting system 1 includes a plurality of cameras 10 (10-1, 10-2, ..., 10-n), a switcher 12, an apparatus control unit 14, a controller 16, a database 18, a recording apparatus 20, a large-size video apparatus 22, a thumbnail acquisition apparatus 24, and the like.

Each of the plurality of cameras 10 (10-1, 10-2, ..., 10-n) is a PTZ camera capable of remotely performing pan control, tilt control, and zoom control.

The switcher 12 is an apparatus that switches output videos of the plurality of cameras 10 (10-1, 10-2, ..., 10-n) on the basis of a control command from the apparatus control unit 14. The output videos switched by the switcher 12 are supplied to, for example, the recording apparatus 20, the large-size video apparatus 22, and the like, or supplied to the controller 16 via the apparatus control unit 14.

The apparatus control unit 14 includes, for example, an information processing apparatus such as a personal computer. The apparatus control unit 14 is connected to the controller 16 that receives an instruction from a user via a transmission channel 26 such as a LAN (Local Area Network) and a wireless LAN. The apparatus control unit 14 controls the cameras 10 (10-1, 10-2, ..., 10-n), the switcher 12, the recording apparatus 20, the large-size video apparatus 22, the thumbnail acquisition apparatus 24, and the like in accordance with commands from the controller 16.

The controller 16 includes, for example, an information processing apparatus such as a personal computer, a tablet, and a smartphone. The controller 16 includes an input unit that receives various inputs from the user and a display unit that provides various GUIs (Graphical User Interfaces) to the user. In this embodiment, a controller in which a touch sensor panel as the input unit is attached onto a liquid crystal display panel as the display unit is used. Of course, the display unit and the input unit may be configured separately like a monitor and a mouse.

As an information processing apparatus, the apparatus control unit 14 and the controller 16 both include a CPU (Central Processing Unit), a main memory, and other circuits as basic hardware elements.

The recording apparatus 20 is an apparatus for recording a video of a single time axis, that has been obtained by switching the output videos of the respective cameras 10 (10-1, 10-2, ..., 10-n) by the switcher 12. The video recorded by the recording apparatus 20 is reproduced under control of the apparatus control unit 14, and the reproduction video can be viewed on the large-size video apparatus 22 and the display unit of the controller 16.

The large-size video apparatus 22 is an apparatus that is provided in an athletic field and displays a real-time video of a single time axis, that has been obtained by switching the output videos of the respective cameras 10 (10-1, 10-2, ..., 10-n) by the switcher 12, a video reproduced from the recording apparatus 20, other broadcast videos, and the like, for example.

The thumbnail acquisition apparatus 24 generates thumbnail images by taking in and reducing the output videos of the cameras 10 (10-1, 10-2, ..., 10-n) switched by the switcher 12 and supplies it to the apparatus control unit 14. The apparatus control unit 14 is capable of storing the thumbnail images transferred from the thumbnail acquisition apparatus 24 in the database 18 constituted of a storage device or the like. Further, the apparatus control unit 14 transmits the thumbnail images to the controller 16 in response to a request from the controller 16. The thumbnail acquisition apparatus 24 includes, for example, an information processing apparatus such as a personal computer.

The apparatus control unit 14, the cameras 10 (10-1, 10-2, ..., 10-n), the switcher 12, the recording apparatus 20, the large-size video apparatus 22, and the thumbnail acquisition apparatus 24 are connected to one another via a transmission channel 26 such as a LAN and a serial cable.

Figure 2:
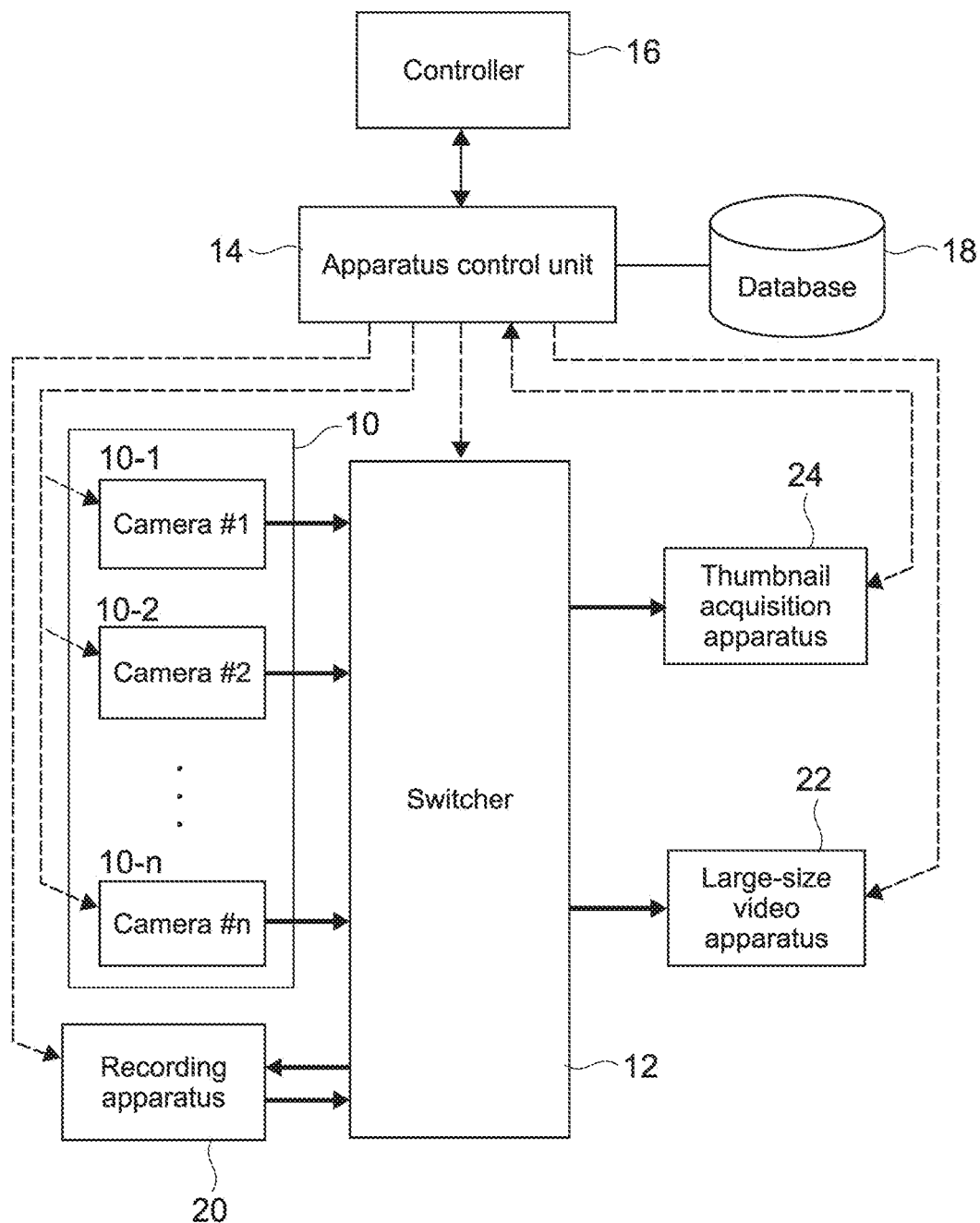
FIG. 2 A block diagram showing a configuration of a video control system in the shooting system 1 shown in FIG. 1.

FIG. 2 is a block diagram showing a configuration of a video control system in the shooting system 1 shown in FIG. 1.

As shown in the figure, on the basis of a command given from the controller 16, the apparatus control unit 14 supplies various types of control information to the plurality of cameras 10 (10-1, 10-2, . . . , 10-n), the switcher 12, the recording apparatus 20, the large-size video apparatus 22, and the thumbnail acquisition apparatus 24. The plurality of cameras 10 (10-1, 10-2, . . . , 10-n) perform pan, tilt, and zoom operations on the basis of the control information from the apparatus control unit 14.

The switcher 12 carries out a switch operation for selecting an output video of the camera 10 (10-1, 10-2, . . . , 10-n) on the basis of the control information from the apparatus control unit 14 and supplying it to the apparatus designated by the apparatus control unit 14 (recording apparatus 20, large-size video apparatus 22, thumbnail acquisition apparatus 24, and apparatus control unit 14). Alternatively, the switcher 12 is also capable of carrying out a switch operation for selecting a reproduction output of the recording apparatus 20 on the basis of the control information from the apparatus control unit 14 and supplying it to the large-size video apparatus 22.

On the basis of the control information from the apparatus control unit 14, the recording apparatus 20 records the output videos of the cameras 10 (10-1, 10-2, . . . , 10-n) supplied from the switcher 12 onto a recording medium. The large-size video apparatus 22 displays video data supplied from the switcher 12 on the basis of the control information from the apparatus control unit 14.

On the basis of control information for requesting an image from the apparatus control unit 14, the thumbnail acquisition apparatus 24 takes in the output videos of the respective cameras 10 (10-1, 10-2, . . . , 10-n) via the switcher 12 and reduces each of the videos to generate thumbnail images, and transmits them back to the apparatus control unit 14.

[Operation of Shooting System 1]

In this shooting system 1, as a preparation for shooting,
1. installation of each camera in athletic field
2. setting of each camera (generation of scenario creation preset information)
3. creation of scenario are carried out sequentially.

Hereinafter, each of the operations will be described.

[1. Arrangement of Each Camera in Athletic Field]

First, the plurality of cameras 10 are set in an athletic field by the user.

Figure 3:
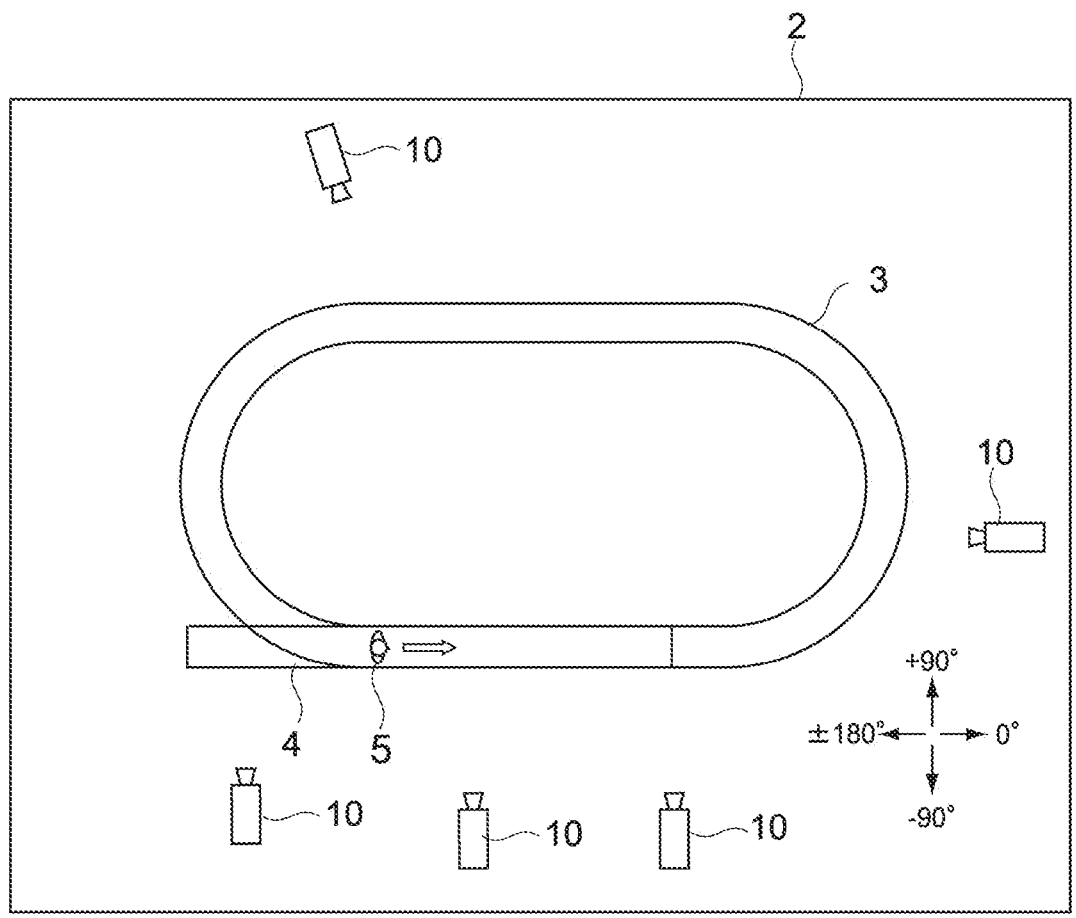
FIG. 3 A diagram showing an arrangement example of respective cameras 10 in a stadium 2.

FIG. 3 is a diagram showing an arrangement example of the respective cameras 10 in the athletic field 2.

In the athletic field 2, a track 3 and straight course 4 for track and field competitions, and the like are provided. Here, the track 3, the straight course 4, and the like are collectively referred to as "course".

The plurality of cameras 10 are set at positions where an athlete 5, who is a subject that moves on the course, can be captured from different directions.

The controller 16 stores therein stereoscopic spatial information of the entire athletic field 2, including position information of each camera 10. Although it is desirable for this stereoscopic spatial information of the entire athletic field 2 to be highly accurate, the present technology does not necessarily require highly-accurate spatial information. Since a specific method of creating spatial information is not a main subject of the present technology, detailed descriptions will be omitted herein. Hereinafter, descriptions will be given under a presupposition that the controller 16 has obtained stereoscopic spatial information of the entire athletic field, including position information of each of the cameras 10 connected to the shooting system 1.

[2. Setting of Each Camera (Generation of Scenario Creation Preset Information)]

First, in order to determine a shooting range of each of the cameras 10, an orientation, a zoom magnification, and the like of each of the cameras 10 are set. The orientation of the camera 10 is set by a pan angle and a tilt angle. The controller 16 is capable of causing the display unit of the controller 16 to display a camera setting GUI in response to a request from the user so as to enable the user to easily set the orientation and zoom magnification of each of the cameras 10.

Figure 4:
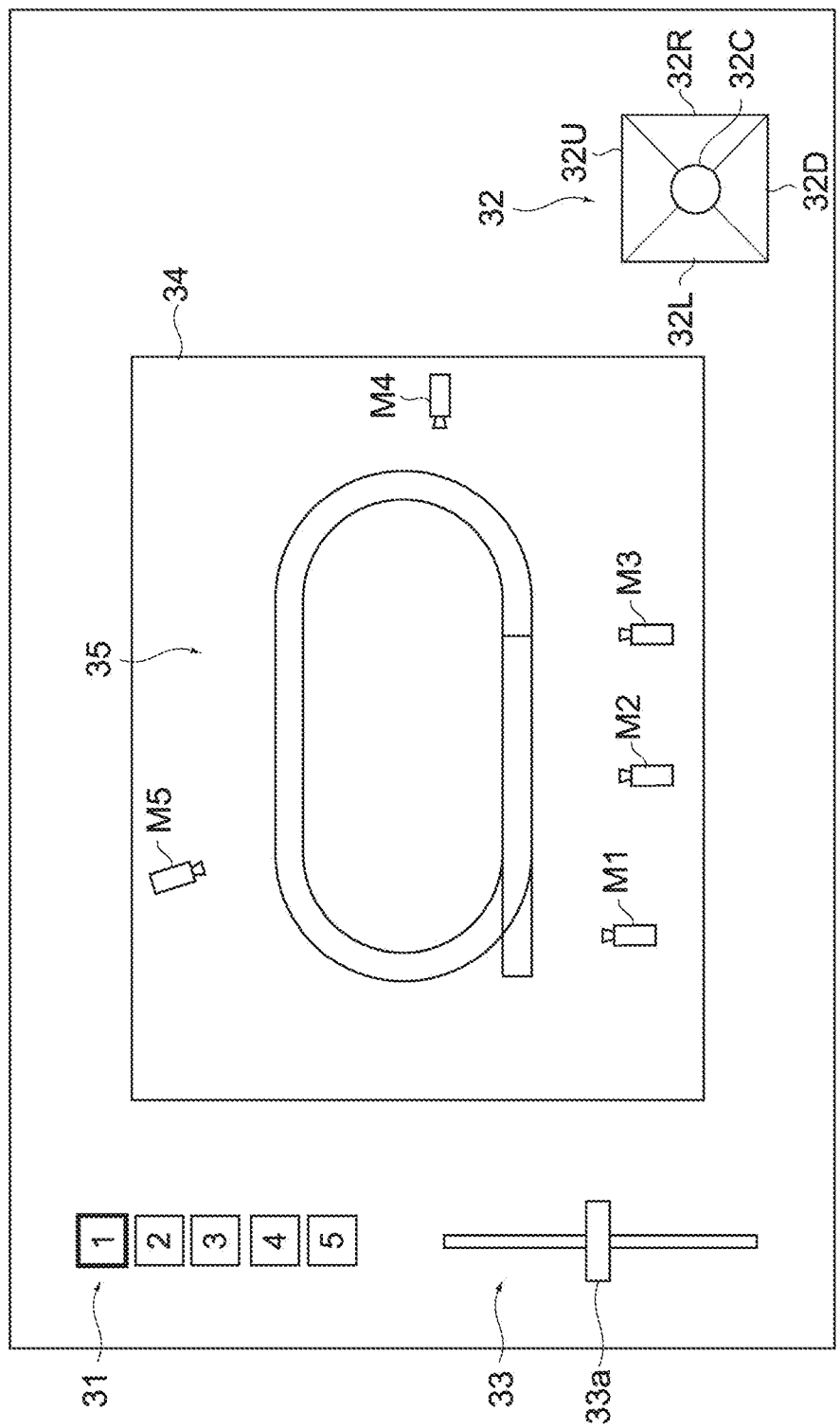
FIG. 4 A diagram showing a camera setting GUI screen.

FIG. 4 is a diagram showing a camera setting GUI screen. A camera arrangement display area 34, a camera selection button 31, a pan/tilt operation button 32, a zoom slider 33, and the like are provided on the camera setting GUI screen (first GUI).

In the camera arrangement display area 34, a spatial image 35 of the athletic field including the course is displayed. In the spatial image 35 of the athletic field, camera marks M1, M2, . . . , M5 indicating positions of the respective cameras 10 connected via the controller 16 and the apparatus control unit 14 are arranged.

The camera selection button 31 is a button for receiving a user selection of a setting target camera 10 out of the cameras 10 connected to the controller 16. Therefore, the camera selection button 31 is constituted of a button group corresponding to the number of connected cameras 10. When a button corresponding to the setting target camera 10 is touched by the user out of the button group of the camera selection button 31, the controller 16 judges the camera 10 corresponding to that touched button. For responding to the user that the setting target camera 10 has been judged, the controller 16 changes a display form such as a color of that button and also changes a display form such as a color, size, and the like of the corresponding one of the camera marks M1, M2, . . . , M5 in the spatial image 35 of the athletic field displayed in the camera arrangement display area 34. In the example shown in FIG. 4, as a button "1" of the camera selection button 31 is touched by the user, a display form of the camera mark M1 corresponding to the camera 10 associated with that button "1" is changed.

The pan/tilt operation button 32 is a button for operating the pan angle and tilt angle of the setting target camera 10. The pan/tilt operation button 32 includes 4 divisional areas 32U, 32D, 32L, and 32R at upper, lower, left-, and right-hand portions and a center area 32C. An operation of turning the camera 10 in a left-hand direction is allocated to a tap operation on the left-hand divisional area 32L and a drag operation from the center area 32C to the left-hand divisional area 32L in the pan/tilt operation button 32. Similarly, an operation of turning the camera 10 in a right-hand direction is allocated to a tap operation on the right-hand divisional area 32R and a drag operation from the center area 32C to the right-hand divisional area 32R. Further, an operation of tilting the camera 10 in an upward direction is allocated to a tap operation on the upper divisional area 32U and a drag operation from the center area 32C to the upper divisional area 32U. Similarly, an operation of tilting the camera 10 in a downward direction is allocated to a tap operation on the lower divisional area 32D and a drag operation from the center area 32C to the lower divisional area 32D. Furthermore, a tap repetition velocity and a drag repetition velocity are associated with the respective velocities of the turn and tilt.

The controller 16 generates a command for detecting a tap operation and a drag operation of the pan/tilt operation button 32 and controlling the pan angle and tilt angle of the camera 10 corresponding to the detected operation, and supplies it to the apparatus control unit 14 via the transmission channel 26. Upon receiving the command from the controller 16, the apparatus control unit 14 outputs control information for controlling the pan angle and tilt angle of the corresponding camera 10 to that camera 10. As a result, the pan angle and tilt angle of the camera 10 are changed.

The zoom slider 33 is means for operating the zoom magnification of the setting target camera 10. For increasing the zoom magnification of the camera 10, a lever 33a of the zoom slider 33 is slid upwardly by a drag operation or the like. Conversely, for lowering the zoom magnification of the camera 10, the lever 33a of the zoom slider 33 is slid downwardly by a drag operation or the like. An upper and lower movable range of the lever 33a corresponds to a range of the zoom magnification.

Upon detecting an operation of the lever 33a of the zoom slider 33, the controller 16 generates a command for controlling the zoom magnification of the setting target camera 10, and supplies it to the apparatus control unit 14 via the transmission channel 26. Upon receiving the command from the controller 16, the apparatus control unit 14 outputs control information for controlling the zoom magnification of the corresponding camera 10 to the camera 10 via the transmission channel 28. As a result, the zoom magnification of the camera 10 is updated.

By causing the output video of that camera 10 to be displayed in real time on a screen of the large-size video apparatus 22 or the like, for example, the user can perform the operation of setting the pan angle, tilt angle, and zoom magnification of the setting target camera 10 described above while viewing the actual output video. Alternatively, the setting operation may be performed while causing the output video to be displayed on the display unit of the controller 16.

Further, in this camera setting GUI, a function of automatically turning, when the user directly touches an arbitrary position of the camera arrangement display area 34, the camera 10 to that touched position is incorporated. At this time, the tilt angle may also be calculated and changed automatically. Further, along with the update of the pan angle and tilt angle of the camera 10, the zoom magnification may be automatically updated so that a size of the subject within an angle of view of the camera does not change.

When the pan angle, tilt angle, and zoom magnification of the setting target camera 10 are determined, the user subsequently inputs a command for registering these pieces of setting information in the system to the controller 16. Upon receiving this command, the controller 16 instructs the apparatus control unit 14 via the transmission channel 26 to register scenario creation preset information including the respective determined values of the pan angle, tilt angle, and zoom magnification in the database 18. The apparatus control unit 14 registers the scenario creation preset information in the database 18 in accordance with this instruction.

The scenario creation preset information includes a preset ID, a camera ID, a title, a pan angle, a tilt angle, a zoom magnification, a file name of a thumbnail image, and the like.

The preset ID is information for identifying the scenario creation preset information and is generated automatically in a sequential order every time the scenario creation preset information is registered, for example.

The camera ID is information for identifying the camera 10.

The title is created by the user when the scenario creation preset information is registered. For example, as a title of scenario creation preset information that has a starting point of the straight course 4 in the athletic field 2 as a shooting range, a title with which the user can easily grasp the shooting range, such as "100 m start", is input by the user.

The respective values of the pan angle, tilt angle, and zoom magnification are values determined by the user using the camera setting GUI. These values are given from the controller 16 to the apparatus control unit 14 simultaneous with the instruction from the controller 16 to the apparatus control unit 14 to register the scenario creation preset information in the database 18.

The file name of a thumbnail image is a file name of a thumbnail image generated by the thumbnail acquisition apparatus 24 from the output video of the setting target camera 10. The file name of a thumbnail image is generated by the thumbnail acquisition apparatus 24 using information on a relevant camera ID, date and time, and the like when a thumbnail image is generated by the thumbnail acquisition apparatus 24. More specifically, upon receiving an instruction to register the scenario creation preset information in the database 18 from the controller 16, the apparatus control unit 14 causes the thumbnail acquisition apparatus 24 to take in the output video of the corresponding camera 10 via the switcher 12. The thumbnail acquisition apparatus 24 reduces the video that has been taken in to generate a file of a thumbnail image, and transmits it to the apparatus control unit 14 via the transmission channel 28. The apparatus control unit 14 stores the file of the thumbnail image transmitted from the thumbnail acquisition apparatus 24 in the database 18. In this way, the apparatus control unit 14 can obtain the file name of the thumbnail image. It should be noted that information for specifying a thumbnail image may be a file path.

The camera setting as described above is similarly repeated for all the cameras 10 set in the athletic field 2. Moreover, a plurality of pieces of scenario creation preset information in which at least any one of the pan angles, the tilt angles, and the zoom magnifications differ may be registered for one camera 10. FIG. 5 shows a registration example of the scenario creation preset information of all the cameras 10 set in the athletic field 2.

Incidentally, it is desirable for the title included in the scenario creation preset information to be input by the user him/herself so that the user can easily grasp the shooting range.

Figure 6:
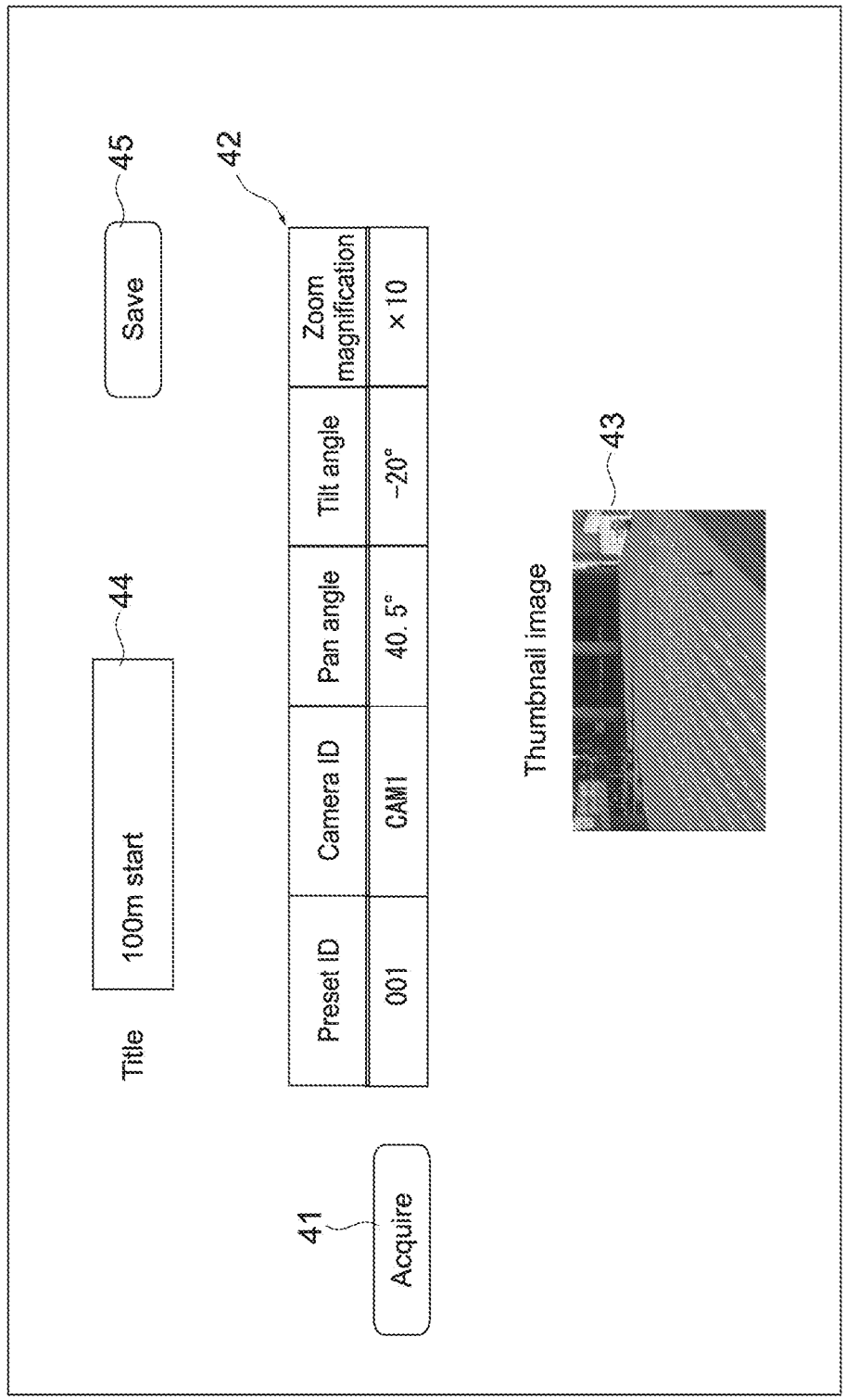
FIG. 6 A diagram showing an example of a camera preset panel in the shooting control system according to the first embodiment.

FIG. 6 is a diagram showing an example of a title editing screen.

In this preset editing screen, an acquisition button 41 for the scenario creation preset information is provided. When the acquisition button 41 is touched by the user, the controller 16 reads out contents 42 and thumbnail image 43 of scenario creation preset information for which a title is not yet set from the database 18 and displays them on the preset editing screen. A title input area 44 is provided on the preset editing screen. The user can input a character string of the title in the title input area 44 using the input unit of the controller 16. After that, when a save button 45 provided on the preset editing screen is touched by the user, the controller 16 stores the title input to the title input area 44 in the database 18 as a title belonging to the scenario creation preset information being displayed.

By storing the scenario creation preset information having such a configuration in the database 18, the pan angle, tilt angle, and zoom magnification of the corresponding camera 10 can thereafter be reproduced on the basis of an arbitrary piece of the scenario creation preset information.

[3. Creation of Scenario]

By the operation described above, the scenario creation preset information of the respective cameras requisite for creating a scenario is prepared in the database 18. Therefore, after that, the controller 16 can carry out processing for supporting creation of a scenario intended by the user using the scenario creation preset information stored in the database 18.

Next, the creation of a scenario will be described.

FIG. 7 is a diagram showing a scenario editing screen (second GUI).

On the scenario editing screen, a scene addition button 51, a scene deletion button 52, an information setting area 53, and a scenario name input area 54 are provided. The information setting area 53 includes a scene number display area 53a, a camera selection area 53b, a preset selection area 53c, and a trigger selection area 53d.

When the scene addition button 51 is touched by the user, the controller 16 causes the information setting area 53 for that scene to be displayed on the scenario editing screen. In a case of setting a first scene, number "1" meaning the first scene (scene 1) is displayed in the scene number display area 53a in the information setting area 53. For this scene 1, the user can select the camera 10 in the information setting area 53. Specifically, when the camera selection area 53b is touched, a pull-down menu for camera selection appears. By the user touching the camera ID of the target camera in this pull-down menu, that camera ID is set for the scene 1. The example shown in FIG. 7 shows that the camera ID of "CAM 1" is set for the scene 1. It should be noted that the same camera ID may be set for a plurality of different scenes.

Subsequently, the user touches the preset selection area 53c in the information setting area 53. When the preset selection area 53c is touched by the user, a pull-down menu for preset selection appears. By the user touching the target preset ID in this pull-down menu, that preset ID is set for the scene 1. The example shown in FIG. 7 shows that a preset ID "Pre001" has been set for the scene 1. It should be noted that the same preset ID may be set for a plurality of different scenes.

Further, as shown in FIG. 5, in a case where a plurality of pieces of scenario creation preset information are associated with a single camera 10, the user can determine desired scenario creation preset information mainly from the title. However, there are cases where it is difficult to determine desired scenario creation preset information with only the title. For example, in a case where the plurality of pieces of scenario creation preset information happen to have the same title or similar titles, or the like, the user gets confused in the determination.

The search/sort function of the scenario creation preset information is useful in such a case.

The controller 16 searches the database 18 for scenario creation preset information including a camera ID designated by the user and causes the display unit of the controller 16, for example, to display a result of a sort using a value of the preset ID and the like.

Figure 8:
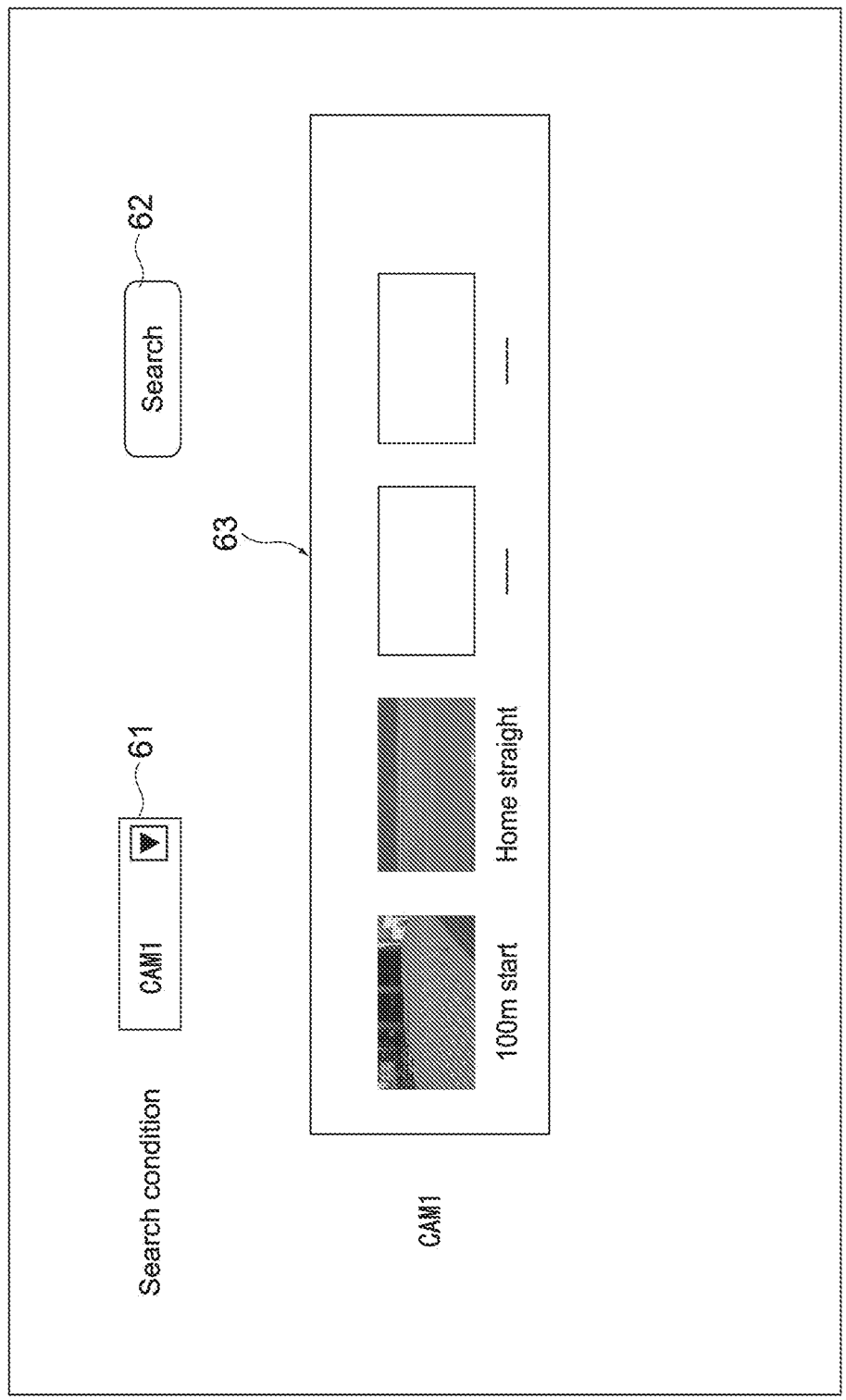
FIG. 8 A diagram showing an example of a search/sort result screen of scenario generation preset information.

FIG. 8 is a diagram showing an example of a search/sort result screen of scenario creation preset information.

This search/sort result screen includes a camera selection area 61 which is a search condition. When this camera selection area 61 is touched by the user, a pull-down menu for camera selection appears. By the user touching a target camera ID in this pull-down menu, that camera ID is set as the search condition.

After that, when a search start button 62 provided on the search/sort result screen is touched by the user, the controller 16 reads out scenario creation preset information including the camera ID set as the search condition from the database 18. The controller 16 acquires a thumbnail image on the basis of a file name of a thumbnail image included in the readout scenario creation preset information, adds a title to this thumbnail image, and causes it to be displayed in the search result area 63 of the search/sort result screen. In a case where a plurality of pieces of scenario creation preset information are searched for with respect to a single camera ID, the controller 16 sorts and displays these plurality of search results, for example, using a value of the preset ID and the like, for example.

It should be noted that in addition to the thumbnail image and the title, the pan angle, the tilt angle, the zoom magnification, and the like may also be displayed in the search result area 63.

In addition, the plurality of search results may be displayed while being sorted in an order of characters in the title.

Further, a real-time video actually captured by the camera 10 may be displayed in this search result area 63 of the search/sort result screen in place of the thumbnail image.

For example, when any one of the thumbnail images displayed in the search result area 63 of the search/sort result screen is touched by the user, the controller 16 extracts values of the pan angle, tilt angle, and zoom magnification from the scenario creation preset information including the touched thumbnail image and supplies control information to the camera 10 via the apparatus control unit 14, and also controls the switcher 12 to select an output video of that camera 10 and supply it to the controller 16 via the apparatus control unit 14.

Accordingly, the output video of the camera 10 is transmitted to the controller 16 via the switcher 12 and the apparatus control unit 14. The controller 16 reduces the transmitted video to a size of a thumbnail image and causes a real-time video actually captured by the camera 10 to be displayed in the search result area 63 of the search/sort result screen in place of the thumbnail image.

In this way, the user can check the thumbnail image included in the scenario creation preset information or the real-time video captured by the camera 10 on the search/sort result screen. Accordingly, it becomes easy to select desired scenario creation preset information at a time of creating a scenario.

Descriptions will return to the descriptions on the scenario editing screen shown in FIG. 7.

Subsequent to the selection of the camera ID and the preset ID, the user selects a trigger. The trigger is a trigger for starting shooting based on scenario creation preset information. Types of the trigger include, for example, a pistol sound instructing a start of a competition, an elapsed time, a take, and the like. The take is a switch instruction given manually by the user.

When the trigger selection area 53d in the information setting area 53 of the scenario editing screen is touched by the user, a pull-down menu for trigger selection appears. The trigger is set by the user touching a desired trigger in this pull-down menu.

It should be noted that in a case where an elapsed time is selected as the trigger, a pull-down menu for prompting the user to select a value of that elapsed time appears, and thus the user can select a desired elapsed time value in this pull-down menu.

The camera ID, the preset ID, and the trigger are set for the scene 1 as described above, and the information setting for the scene 1 is completed.

When the user subsequently touches the next scene addition button 51 (below) after the setting of the camera ID, the preset ID, and the trigger for the scene 1 is completed, the controller 16 adds the information setting area 53 for a scene 2 and similarly performs the setting of the camera ID, the preset ID, and the trigger in this information setting area 53 for the scene 2. Here, the user can freely determine how many scenes are to be added. FIG. 7 shows a case where a total of 6 scenes are added.

After that, the user can input an arbitrary scenario name in the scenario name input area 54 provided on the scenario editing screen. The scenario name is a name with which the user can understand the purpose of the scenario. For example, names of athletic events such as "100 m run" and "200 m run" are used as the scenario name.

Finally, as the user touches a save button 55, the controller 16 stores the values of the camera ID, the preset ID, and the trigger that have been set for each scene in the database 18 in association with the scenario name input to the scenario name input area 54. One scenario is obtained as described above.

(Preset Editing Screen for Turn Shooting)

Next, descriptions will be given on the creation of scenario creation preset information for performing shooting while changing at least one of the pan angle, tilt angle, and zoom magnification of the camera 10 so as to follow an athlete moving on the course.

Here, for example, a case where scenario creation preset information already stored in the database 18 is re-edited so that it corresponds to turn shooting will be assumed.

Figure 9:
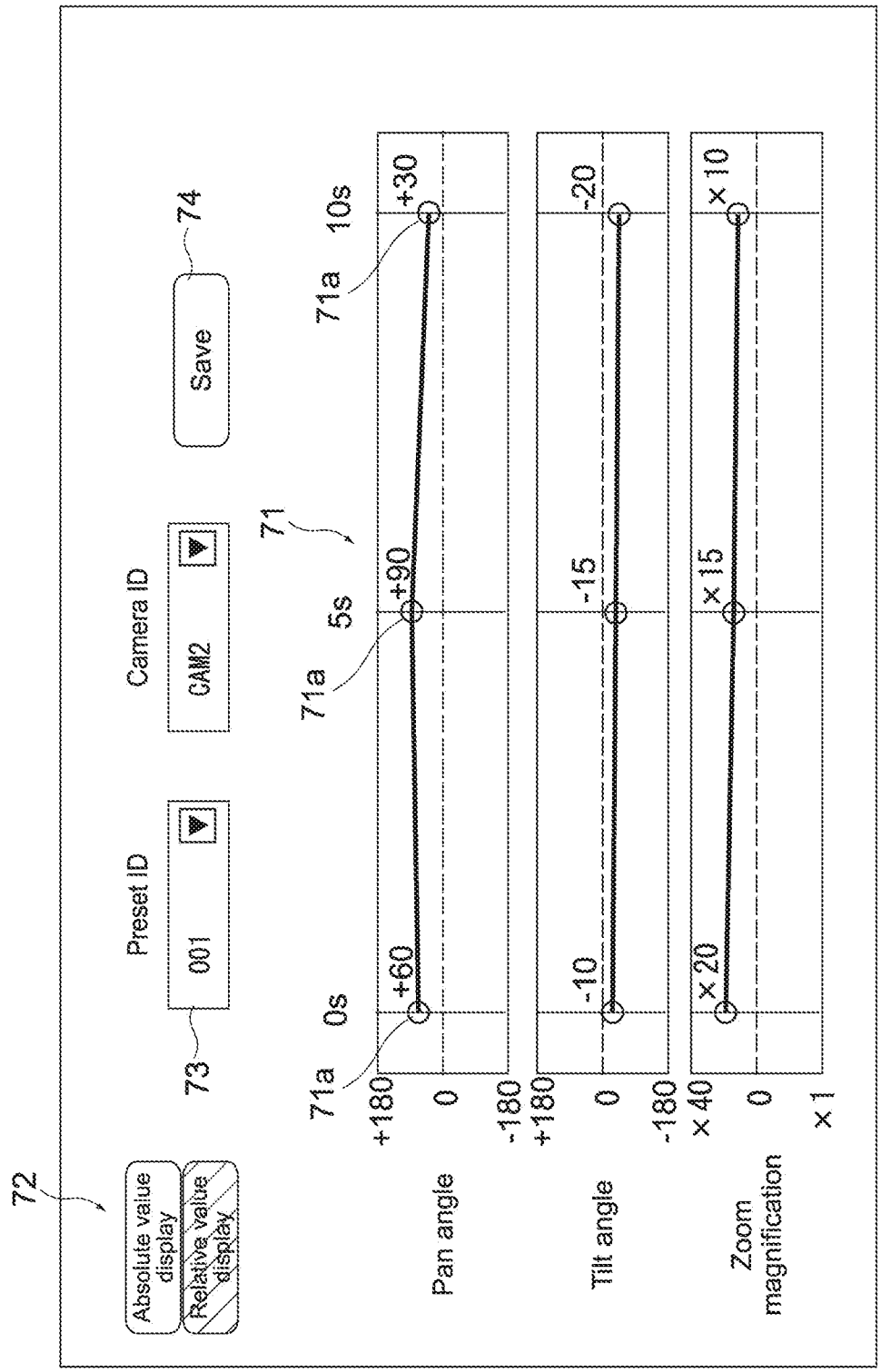
FIG. 9 A diagram showing an example of a preset editing screen for turn shooting.

FIG. 9 is a diagram showing the preset editing screen for turn shooting.

In this preset editing screen (third GUI) for turn shooting, an editing area 71 where respective values of the timing information, the pan angle, the tilt angle, and the zoom magnification requisite for performing shooting while moving a shooting range of the camera 10 can be set individually in a two-dimensional space where an abscissa axis represents a time axis and an ordinate axis represents a value, is provided.

For example, the example of FIG. 9 is a setting example of the respective values of the pan angle, the tilt angle, and the zoom magnification at 3 timings, that is, when the camera 10 is switched (0 elapsed time), a time when 5 seconds have elapsed, and a time when 10 seconds have elapsed.

Here, as shown in FIG. 3, it is assumed that a direction in which the athlete 5 runs along the straight course 4 is 0 degree, a range that is 180 degrees leftward from the direction of 0 degree is a +180 degree range from 0 degree, and a range that is 180 degrees rightward from the direction of 0 degree is a −180 degree range from 0 degree.

The value of the pan angle in the editing area 71 of FIG. 9 indicates the pan angle of the camera 10. The pan angle of the camera 10 at the time 0 second has elapsed is +60 degrees, and the pan angle of the camera 10 at the time 5 seconds have elapsed is +90 degrees. This means that the pan angle of the camera 10 has been set so as to turn from +60 degrees to +90 degrees in 5 seconds from the time 0 second has elapsed to the time 5 seconds have elapsed. Furthermore, the pan angle of the camera 10 at the time 10 seconds have elapsed is +30 degrees. In other words, this means that the pan angle of the camera 10 has been set so as to turn from +90 degrees to +30 degrees in 5 seconds from the time 5 seconds have elapsed to the time 10 seconds have elapsed.

Further, in the example of FIG. 9, the tilt angle of the camera 10 at the time 0 second has elapsed is set to be −10 degrees, and the tilt angle of the camera 10 at the time 5 seconds have elapsed is set to be −15 degrees. This means that the tilt angle of the camera 10 has been set so as to change from −10 degrees to −15 degrees in 5 seconds from the time 0 second has elapsed to the time 5 seconds have elapsed. Further, the tilt angle of the camera 10 at the time 10 seconds have elapsed is set to be −20 degrees. In other words, this means that the tilt angle of the camera 10 has been set so as to change from −15 degrees to −20 degrees in 5 seconds from the time 5 seconds have elapsed to the time 10 seconds have elapsed.

Similarly, the example of FIG. 9 shows a case where the zoom magnification is set to become 20 times at the time 0 second has elapsed, 15 times at the time 5 seconds have elapsed, and 10 times at the time 10 seconds have elapsed.

In the editing area 71, the respective setting values of the pan angle, the tilt angle, and the zoom magnification at each of the elapsed times are set by, for example, dragging respective operators 71a in the editing area 71 to positions of target values or directly inputting numerical values in an input area (not shown).

Regarding the time positions at which the setting values are set, such as the time 0 second has elapsed, the time 5 seconds have elapsed, and the time 10 seconds have elapsed, an arbitrary time position may be designated by the user in the editing area 71 by a touch operation to the editing area 71 or an input to a numerical value input area. The values set in the editing area 71 are reflected on the scenario creation preset information specified by the preset ID selected by the user in the preset selection area 73. Accordingly, it becomes possible to create scenario creation preset information used for a scenario for performing shooting while changing at least one of the pan angle, tilt angle, and zoom magnification of the camera 10 so as to follow an athlete moving on the course.

Figure 10:
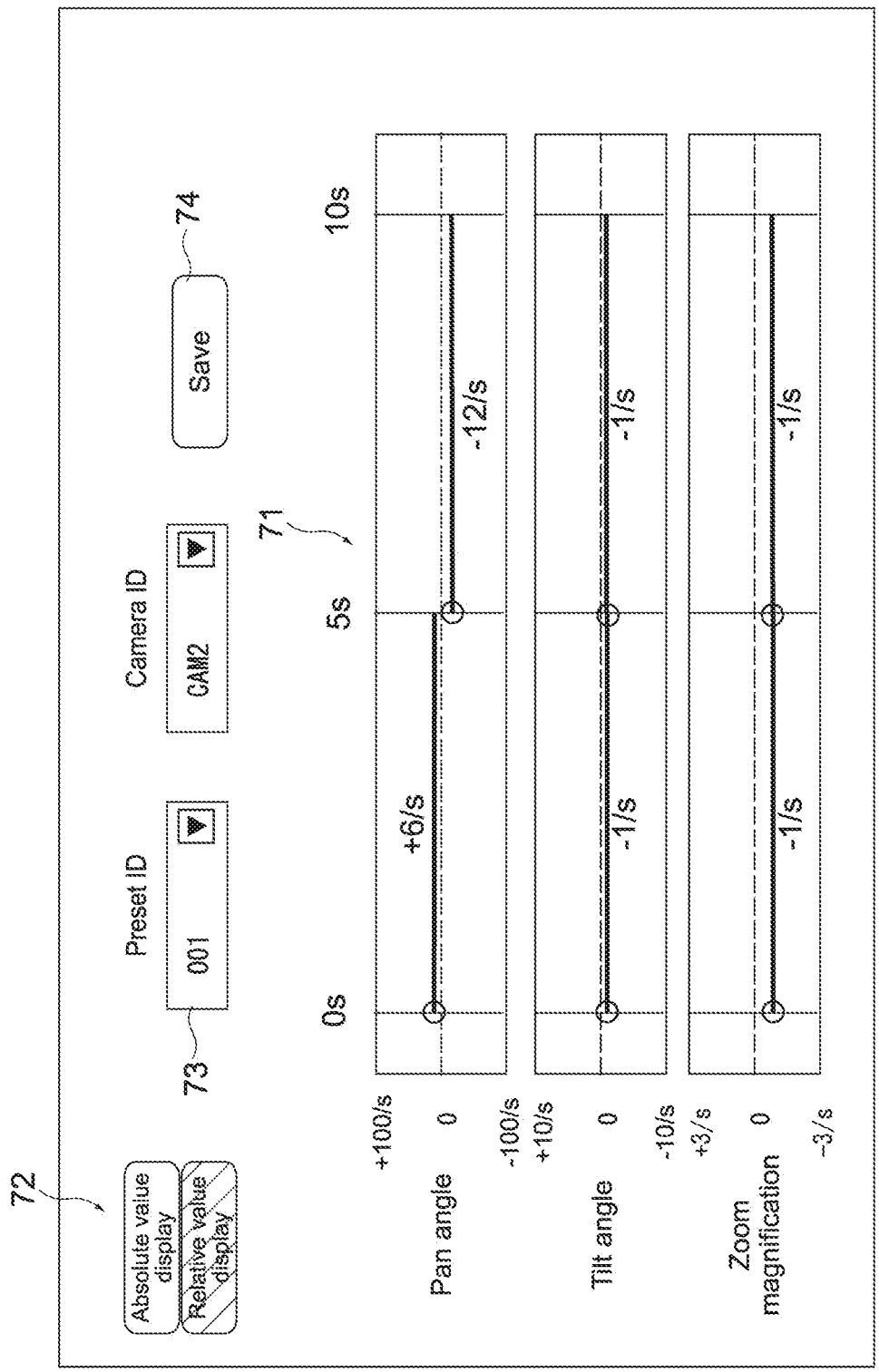
FIG. 10 A diagram showing another example of the preset editing screen for turn shooting.

Further, in the preset editing screen for turn shooting shown in FIG. 9, the respective setting values of the pan angle, the tilt angle, and the zoom magnification in the editing area 71 are displayed by absolute values, but the values may be displayed by relative values as shown in FIG. 10. Alternatively, it is also possible to enable the user to appropriately select the absolute value display or the relative value display using a display switch button 72 provided on the preset editing screen for turn shooting.

Here, although a pan velocity, a tilt velocity, and a change velocity of zoom magnification of the camera 10 between the two elapsed times are constant, the velocities may be set so as to gradually accelerate or decelerate.

(Regarding Automatic Generation of Scenario)

Up to this point, the case where the user generates a scenario mainly by a manual operation under the support of the shooting system 1 of this embodiment has been described, but it is also possible for the controller 16 to automatically create at least a part of the scenario.

As a specific example, there is a method in which the controller 16 judges an output video of an optimum camera 10 on the basis of position information of a plurality of points predetermined on the course and position information of each of the cameras 10.

Figures 11, 12:
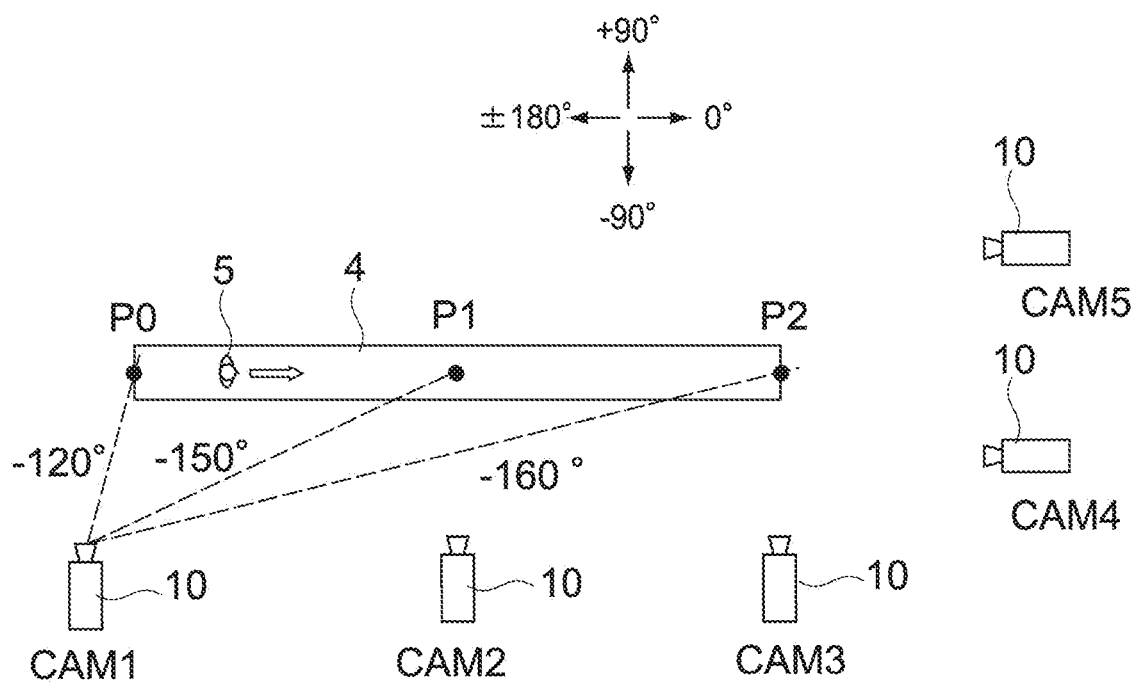
FIG. 11 A diagram for explaining an operation of judging an optimum camera 10 on the basis of position information of a plurality of points on a course and position information of the respective cameras 10.
FIG. 12 A diagram showing a result of calculating angle positions of 5 cameras 10 seen from points P0, P1, and P2 of FIG. 11.

FIG. 11 is a diagram for explaining an operation of judging an optimum camera 10 on the basis of the position information of a plurality of points on the course and the position information of each of the cameras 10.

For example, a case where a competition in which a subject starts to move from a starting point P0 of the straight course 4, passes a predetermined passing point P1, and aims for a goal point P2, is a shooting target will be assumed.

5 cameras 10 (CAM 1, CAM 2, CAM 3, CAM 4, CAM 5) are arranged around the course of the straight course 4. It is assumed that a direction in which the athlete runs along the straight course 4 is 0 degree, a range that is 180 degrees leftward from the direction of 0 degree is a +180 degree range from 0 degree, and a range that is 180 degrees rightward from the direction of 0 degree is a −180 degree range from 0 degree.

In this specific example, a criterion for judging an output video of an optimum camera 10 is provided in advance in the controller 16 on the basis of angular positions of the cameras 10 viewed from the 3 points P0, P1, and P2. For example, a selection criterion with which, for example, assuming that the angle of the position of the camera 10 viewed from the points P0, P1, and P2 is $\alpha$, one camera 10 satisfying $30°>\alpha>-90$ with a being a minimum value is judged as an optimum camera, is given.

It should be noted that the selection criterion for an optimum camera may be determined or changed by the user.

FIG. 12 is a diagram showing a result of calculating the angular positions of the 5 cameras 10 (CAM 1, CAM 2, CAM 3, CAM 4, CAM 5) as viewed from the 3 points P0, P1, and P2 described above. The controller 16 judges an optimum camera 10 for each of the starting point P0, the passing point P1, and the goal point P2 on the basis of the optimum camera selection criterion described above.

As a result, it is judged that the optimum camera 10 for a range from the starting point P0 to right before the passing point P1 is the CAM 2, and an optimum camera 10 for a range from the passing point P1 to right before the goal point P2 is the CAM 3. Then, at the goal point P2, the CAM 4 camera 10 is judged to be optimum.

Figure 13:
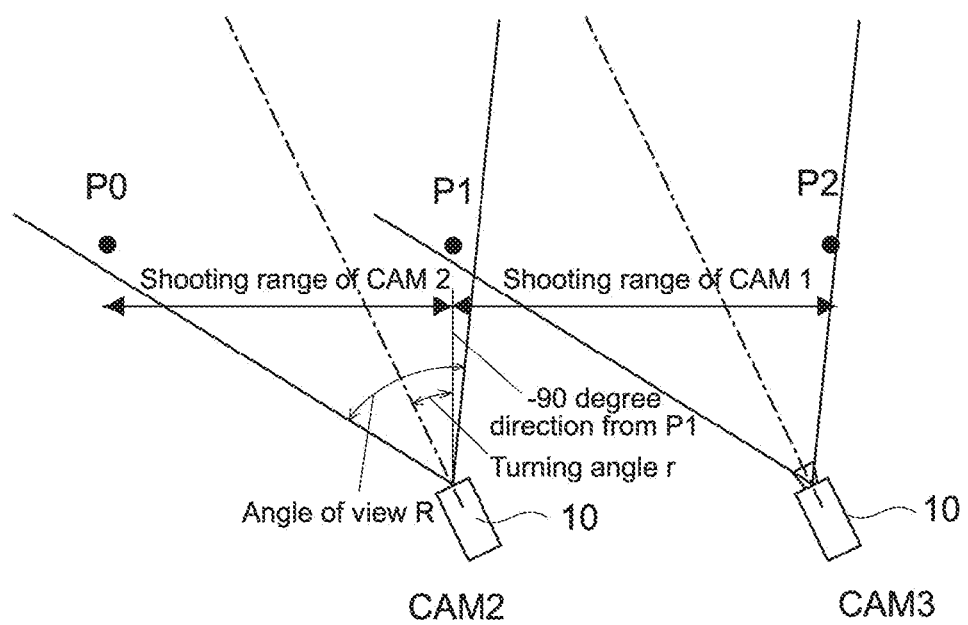
FIG. 13 A diagram showing a setting of a shooting range of a camera judged as optimum.

In this way, by preparing the camera selection criterion in advance, the controller 16 can automatically judge the camera 10 having an optimum positional relationship with the respective points on the course. After the optimum camera 10 is judged, it is possible to determine, with the shooting range of each of the cameras 10 being a target, an orientation, initial angle of view R, turning angle r, and the like of the camera 10 as shown in FIG. 13.

Further, regarding the turning velocity, if velocity information of the subject on the course is known, it is possible to obtain, by the controller 16, an optimum value with which the subject always comes to a center of the angle of view of the camera 10. It is desirable for the velocity information of the subject to be managed on the basis of a type of the athletic event, a level of an athlete, and age and sex. The user only needs to switch the velocity information of the subject to be adopted as appropriate and set it in the controller 16.

Furthermore, it is also possible to measure a movement velocity of the athlete up to several meters from the starting point of the course and reflect this measurement result on the turning velocity of the camera 10 in the scenario. Accordingly, it becomes possible to lower a probability of the subject deviating from the angle of view of the camera. The measurement of the movement velocity of the athlete can be performed on the basis of an output video of the camera allocated to the measurement.

The created scenario is stored in the database 18.

The user can browse a list of scenarios stored in the database 18 via the display unit of the controller 16 and select a scenario to be used for shooting from the list.

The controller 16 reads information of the scenario selected by the user from the database 18 and outputs control information to the plurality of cameras 10 and the switcher 12 via the apparatus control unit 14 so that the shooting by the plurality of cameras 10 is performed in accordance with this scenario. As a result, a state of the competition by the plurality of cameras 10 according to the scenario is captured, a video selected via the switcher 12 is output to the recording apparatus 20 to be recorded in the recording apparatus 20, and the video selected via the switcher 12 is output to the large-size video apparatus 22 for display.

Figure 14:
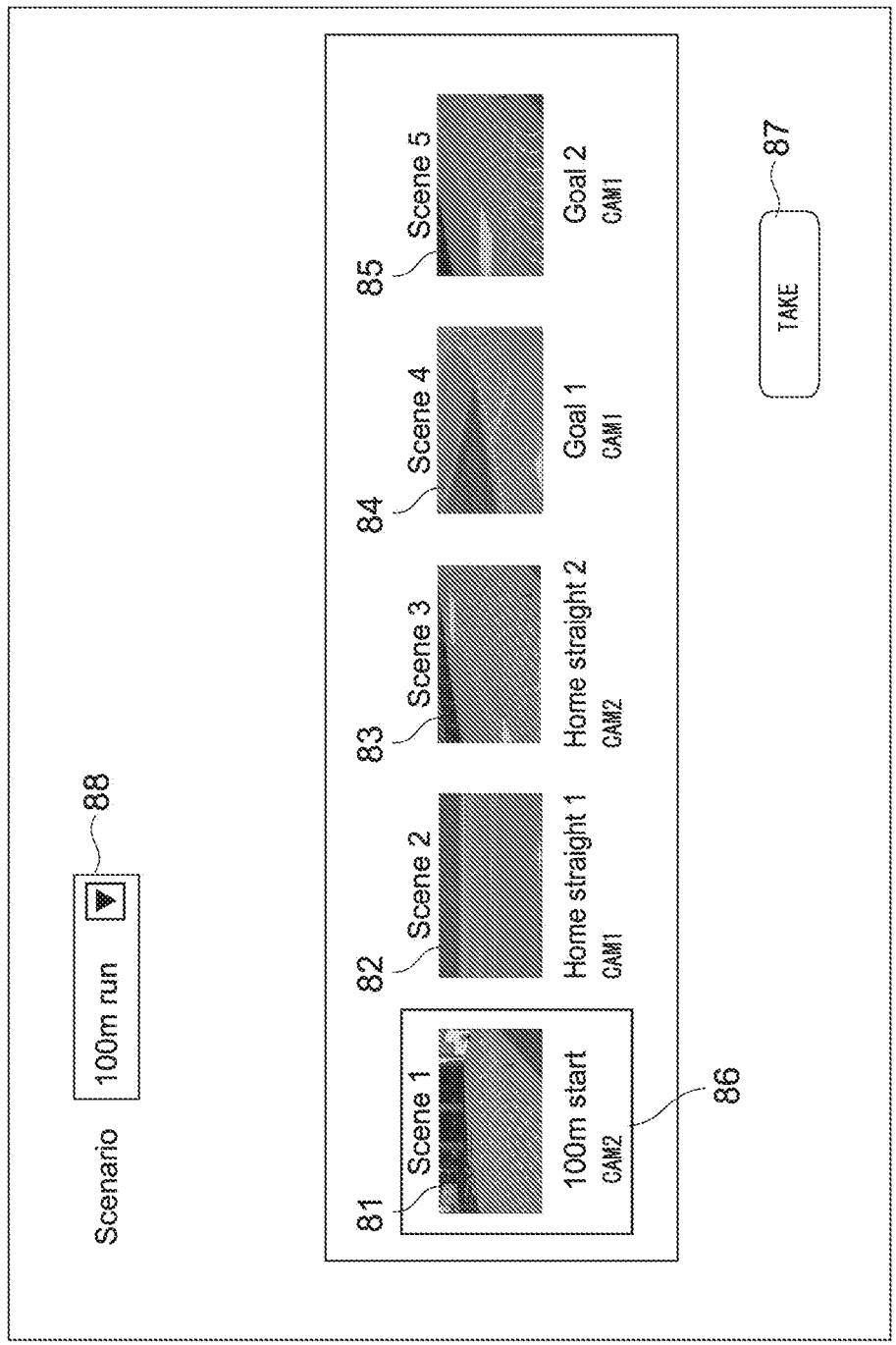
FIG. 14 A diagram showing an example of a shooting state monitor screen displayed on a display unit of a controller 16 during shooting of a game.

FIG. 14 is a diagram showing an example of a shooting state monitor screen displayed on the display unit of the controller 16 during shooting of a game.

On this shooting state monitor screen, the user can monitor output videos of the respective cameras 10 and instruct a switch execution timing of the cameras 10 determined by a scenario.

Specifically, during the shooting of a game, the thumbnail acquisition apparatus 24 takes in output videos from the respective cameras 10 at constant time intervals via the switcher 12, reduces the output videos, and generates a thumbnail image of the output video for each of the cameras 10. The thumbnail acquisition apparatus 24 transfers the generated thumbnail images of the respective cameras 10 to the controller 16 via the apparatus control unit 14.

The controller 16 inserts the thumbnail images of the respective cameras 10 transferred from the thumbnail acquisition apparatus 24 into display areas 81 to 85 of the respective scenes set in the shooting state monitor screen. In this way, the thumbnail images of the respective scenes are displayed on the display unit of the controller 16 in real time.

Further, on the shooting state monitor screen, one of the display areas 81 to 85 corresponding to the current scene in the scenario can be recognized at a glance. For example, by enclosing the display area 81 corresponding to the current scene with a frame 86 of a specific color, or the like, the display area 81 is visually distinguished from the display areas 82 to 85 corresponding to other scenes.

Incidentally, there are scenarios that include "take" as a scene switch trigger. This means that scenes are switched by an instruction from the user. During shooting of a scene which is one scene prior to a scene in which "take" is defined as the scene switch trigger, the controller 16 displays a take button 87 for the controller 16 to receive an instruction of "take" on the shooting state monitor screen. Upon detecting that this take button 87 has been touched by the user, the controller 16 instructs the switcher 12 to switch to shooting of the next scene in accordance with the scenario.

As the shooting progresses to the next scene by the instruction of "take" or the like, the frame 86 indicating the display area 81 corresponding to the current scene moves to the display area corresponding to the next scene so that the user can check the scene switch.

Further, on the shooting state monitor screen, a scenario selection button 88 for selecting a scenario to be used by the user for shooting is provided.

(Effects Etc. Of Shooting System 1 of this Embodiment)

In general, for arranging a plurality of cameras in a large space such as an athletic field and capturing a desired video by setting and switching the respective cameras, a large number of shooting staffs are necessary. In contrast, in the shooting system 1 according to this embodiment, a scenario that defines in what order, in which direction, and at which timing the plurality of cameras 10 arranged in the athletic field are to be switched is created in advance, and the controller 16 controls the respective cameras 10 in accordance with this scenario. Therefore, it becomes possible to minimize the necessary number of shooting staffs.

Further, in the shooting system 1 according to this embodiment, the controller 16 automatically judges an optimum camera 10 for shooting with respect to each of the plurality of points on the course. Therefore, a burden of the user in selecting an optimum camera for the scenario can be largely reduced. Further, in the shooting system 1 according to this embodiment, since the shooting is performed while moving the shooting range of the camera 10, the user can easily create a scenario using a GUI.

Modified Example 1

It should be noted that although the creation of a scenario for camera lark used in the shooting system 1 for capturing a subject moving on a course of the athletic field 2 by the plurality of cameras 10 has been described in the embodiment described above, the present invention is also applicable to a shooting system for capturing a subject on courses other than those of the athletic field 2 where a movement flow of the subject is determined, such as a town course and a forest course, for example.

Furthermore, in the embodiment described above, the position information of the plurality of cameras 10 provided around the course is registered in the system. However, the respective cameras 10 may be arranged by the user in accordance with a camera arrangement template prepared in advance in the system. In this case, it is possible to secure consistency of the position information of the respective cameras 10 in the athletic field with the position information of the cameras on the system side by correcting the position information of the cameras on the system side using information such as GPS information of the cameras 10 provided in the athletic field.

Modified Example 2

It is also possible to cause, by setting a scenario execution schedule for each athletic event, the shooting state monitor screen of a scenario for that athletic event to be automatically displayed on the display unit of the controller 16 on the basis of this execution schedule when reaching a scheduled start time of the athletic event. In this case, in a case where another athletic event is started during shooting of one athletic event, the shooting state monitor screen of the display unit may be divided so that the shooting state monitor screens of the respective athletic events are displayed respectively on the divided screens.

It should be noted that the present technology can also take the following configurations.

(1) A shooting system, including:
a plurality of cameras capable of capturing a subject that moves on a course from different directions; and
a controller that receives a setting made by the user regarding a switch order of the plurality of cameras that temporally share continuous shooting of the subject that moves on the course, and switches output videos of the plurality of cameras in accordance with the set switch order.

(2) The shooting system according to (1), in which
the controller includes a display unit capable of displaying the output videos of the plurality of cameras, and
the controller is configured to control the display unit to display a first GUI for receiving, from the user, a command for setting at least any one of a pan angle, tilt angle, and zoom magnification of the individual cameras while viewing the output videos displayed on the display unit.

(3) The shooting system according to (2), in which
the controller is configured to store, while associating an information set, that is constituted of information that has been set using the first GUI, identification information of the camera to be set, and access information for accessing an output video of the camera to be set, and preset identification information that identifies this information set with each other to obtain a scenario generation preset information, a plurality of pieces of scenario generation preset information in a database.

(4) The shooting system according to (3), in which
the controller is configured to control the display unit to display a second GUI that supports the user to generate a scenario for obtaining a video of a single time axis by temporally switching the output videos of the plurality of cameras, using the plurality of pieces of scenario generation preset information stored in the database.

(5) The shooting system according to (4), in which
the scenario includes one or more scenes in time series, and at least the preset identification information is allocated to each of the scenes.

(6) The shooting system according to (5), in which
the scenario includes information related to a trigger for making a switch between the individual scenes.

(7) The shooting system according to any one of (1) to (6), in which
the controller is configured to control the display unit to display a third GUI for receiving an input from the user regarding timing information and at least any one of the pan angle, the tilt angle, and the zoom magnification as setting information requisite for shooting while changing a shooting range of the camera.

(8) The shooting system according to any one of (1) to (7), in which
the controller is configured to judge an optimum one of the cameras on a basis of position information of a plurality of points on the course and position information of each of the cameras.

REFERENCE SIGNS LIST 1 shooting system
2 athletic field
3 track
4 straight course
10 camera
12 switcher
14 apparatus control unit
16 controller
18 database

The invention claimed is:
1. An apparatus, comprising:
a controller configured to:
control a display unit to display a first graphical user interface (GUI) for registration of preset information, wherein
the preset information comprises a setting for a respective camera of a plurality of cameras, a first preset information of the preset information corresponding to a first camera of the plurality of cameras is registered as a first registered preset information,
a second preset information of the preset information corresponding to a second camera of the plurality of cameras is registered as a second registered preset information, and
the plurality of cameras captures a subject from a plurality of directions;
control the display unit to display a second GUI for selection of at least one of the first registered preset information or the second registered preset information for each scene of a plurality of scenes, wherein a scenario including the plurality of scenes is generated; and
control the display unit to switch between the first GUI and the second GUI.

2. The apparatus according to claim 1, the controller is further configured to:
receive a first user input and a second user input on the first GUI;
set at least one of a pan angle, a tilt angle, or a zoom magnification of the first camera of the plurality of cameras as the first preset information of the preset information based on the received first user input; and
set at least one of a pan angle, a tilt angle, or a zoom magnification of the second camera of the plurality of cameras as the second preset information of the preset information based on the received second user input.

3. The apparatus according to claim 2, further comprising a memory, wherein
the controller is further configured to store the first preset information of the preset information and the second preset information of the preset information in the memory,
the first preset information of the preset information includes identification information of the first camera of the plurality of cameras, access information of an output video of the first camera, first preset identification information, and the at least one of the pan angle, the tilt angle, or the zoom magnification of the first camera of the plurality of cameras,
the second preset information of the preset information includes identification information of the second camera of the plurality of cameras, access information of an output video of the second camera, second preset identification information, and the at least one of the pan angle, the tilt angle, or the zoom magnification of the second camera of the plurality of cameras.

4. The apparatus according to claim 1, wherein the controller is further configured to control selection of an output video which corresponds to the scene based on at least one of the first registered preset information of the preset information or the second registered preset information of the preset information.

5. The apparatus according to claim 4, wherein
the scenario includes the plurality of scenes in a time series,
control first camera of the plurality of cameras for each scene of the plurality of scenes based on the first registered preset information of the preset information, and
control second camera of the plurality of cameras for each scene of the plurality of scenes based on the second registered preset information of the preset information.

6. The apparatus according to claim 1, wherein the scenario includes information associated with a turning velocity of each of the plurality of cameras.

7. The apparatus according to claim 1, wherein the subject is movable on a course.

8. A method, comprising:
controlling, by a controller, a display unit to display a first graphical user interface (GUI) for registration of preset information, wherein
the preset information comprises a setting for a respective camera of a plurality of cameras,
a first preset information of the preset information corresponding to a first camera of the plurality of cameras is registered as a first registered preset information,
a second preset information of the preset information corresponding to a second camera of the plurality of cameras is registered as a second registered preset information, and
the plurality of cameras captures a subject from a plurality of directions;
controlling, by the controller, the display unit to display a second GUI for selection of at least one of the first registered preset information or the second registered preset information for each scene of a plurality of scenes, wherein a scenario including the plurality of scenes is generated; and
controlling, by the controller, the display unit to switch between the first GUI and the second GUI.

9. A non-transitory computer-readable medium having stored thereon, computer-executable instructions which, when executed by a computer, cause the computer to execute operations, the operations comprising:
controlling, by a controller, a display unit to display a first graphical user interface (GUI) for registration of preset information, wherein
the preset information comprises a setting for a respective camera of a plurality of cameras,
a first preset information of the preset information corresponding to a first camera of the plurality of cameras is registered as a first registered preset information,
a second preset information of the preset information corresponding to a second camera of the plurality of cameras is registered as a second registered preset information, and
the plurality of cameras captures a subject from a plurality of directions;
controlling, by the controller, the display unit to display a second GUI for selection of at least one of the first registered preset information or the second registered preset information for each scene of a plurality of scenes, wherein a scenario including the plurality of scenes is generated; and
controlling, by the controller, the display unit to switch between the first GUI and the second GUI.

10. An apparatus, comprising:
a controller configured to:
control a display unit to display a first graphical user interface (GUI) for registration of preset information, wherein
the preset information comprises a setting for a respective camera of a plurality of cameras,
a first preset information of the preset information corresponding to a first camera of the plurality of cameras is registered as a first registered preset information, a second preset information of the preset information corresponding to a second camera of the plurality of cameras is registered as a second registered preset information, and the plurality of cameras captures a subject from a plurality of directions;

control the display unit to display a second GUI for selection of at least one of a specific camera of the plurality cameras for each scene of a plurality of scenes, a trigger for switching between the plurality of scenes, a switch order of the plurality of scenes, or one of the first registered preset information or the second registered preset information for each scene of the plurality of scenes such that a scenario including the plurality of scenes is generated; and control the display unit to switch between the first GUI and the second GUI.

11. A method, comprising:

controlling, by a controller, a display unit to display a first graphical user interface (GUI) for registration of preset information, wherein the preset information comprises a setting for a respective camera of a plurality of cameras, a first preset information of the preset information corresponding to a first camera of the plurality of cameras is registered as a first registered preset information, a second preset information of the preset information corresponding to a second camera of the plurality of cameras is registered as a second registered preset information, and the plurality of cameras captures a subject from a plurality of directions;

controlling, by the controller, the display unit to display a second GUI for selection of at least one of a specific camera of the plurality cameras for each scene of a plurality of scenes, a trigger for switching between the plurality of scenes, a switch order of the plurality of scenes, or one of the first registered preset information or the second registered preset information for each scene of the plurality of scenes such that a scenario including the plurality of scenes is generated; and controlling, by the controller, the display unit to switch between the first GUI and the second GUI.

12. A non-transitory computer-readable medium having stored thereon, computer-executable instructions which, when executed by a computer, cause the computer to execute operations, the operations comprising:

controlling, by a controller, a display unit to display a first graphical user interface (GUI) for registration of preset information, wherein the preset information comprises a setting for a respective camera of a plurality of cameras, a first preset information of the preset information corresponding to a first camera of the plurality of cameras is registered as a first registered preset information, a second preset information of the preset information corresponding to a second camera of the plurality of cameras is registered as a second registered preset information, and the plurality of cameras captures a subject from a plurality of directions;

controlling, by the controller, the display unit to display a second GUI for selection of at least one of a specific camera of the plurality cameras for each scene of a plurality of scenes, a trigger for switching between the plurality of scenes, a switch order of the plurality of scenes, or one of the first registered preset information or the second registered preset information for each scene of the plurality of scenes such that a scenario including the plurality of scenes is generated; and controlling, by the controller, the display unit to switch between the first GUI and the second GUI.

* * * * *